United States Patent [19]

Staas

[11] 4,436,871

[45] Mar. 13, 1984

[54] IMIDE-SAN POLYMER-BLENDS

[75] Inventor: William H. Staas, Churchville, Pa.

[73] Assignee: Rohm and Haas Company, Philadelphia, Pa.

[21] Appl. No.: 376,479

[22] Filed: May 10, 1982

[51] Int. Cl.³ .................... C08L 25/12; C08L 25/14; C08L 35/06; C08L 51/00

[52] U.S. Cl. ........................................ 525/64; 525/66; 525/80; 525/85; 525/186; 525/192; 525/194; 525/205; 525/230

[58] Field of Search .................... 525/73, 77, 66, 205, 525/194, 186, 192, 64, 230

[56] References Cited

U.S. PATENT DOCUMENTS 4,217,424  8/1980  Weese et al. .................... 525/67
4,254,232  3/1981  Mueller ............................ 525/66

Primary Examiner—Carman J. Seccuro
Attorney, Agent, or Firm—Jordan J. Driks

[57] ABSTRACT

Compositions comprising soluble or partly soluble blend of (A) polyglutarimide and (B) styrene-acrylonitrile copolymer, a multiple stage polymer having a styrene-acrylonitrile stage, or mixtures thereof.

12 Claims, No Drawings

4,436,871

IMIDE-SAN POLYMER-BLENDS

BACKGROUND OF THE INVENTION

1. Field of the Invention

This invention relates to polymer-polymer blends.

2. Description of the Prior Art

A new class of polymers, hereafter referred to as "polyglutarimides", having a very interesting range of useful properties have been provided by Kopchik U.S. Pat. No. 4,246,374. Kopchik himself disclosed various possible modifications of the polyglutarimides, as did Mueller in U.S. Pat. No. 4,254,232 and Weese et al in U.S. Pat. No. 4,217,424.

Styrene-acrylonitrile ("SAN") copolymers, of course, are well known, as are various multiple stage polymers having styrene-acrylonitrile copolymer as one stage.

Various attempts have been made to improve the impact strength and other properties of the polyglutarimide family of polymers, as have various attempts been made in the SAN field to improve various properties or property balances.

Because of unfavorable thermodynamics (entropy of mixing) polymer-polymer solutions are rare. Various the theoreticians have attempted to predict polymer-polymer miscibility via complex cohesive energy density calculations or the use of Group Molar Attraction Tables, but there is no good correlation between theory and actual practice via experiments.

SUMMARY OF THE INVENTION

It has become an object of the present invention to provide compositions having improved properties over the individual components.

It is a further object of the present invention to provide improved polyglutarimides.

A still further object is to provide a method of incorporating various compositions in polyglutarimide polymers.

These objects, and others as will become apparent from the following disclosure, are achieved by the present invention which comprises a composition comprising a soluble or partly soluble blend of polyglutarimide and a styrene-acrylonitrile copolymer, a multiple stage polymer having a styrene-acrylonitrile copolymer stage, or a mixture thereof.

DETAILED DESCRIPTION OF THE INVENTION AND THE PREFERRED EMBODIMENTS

The compositions of this invention comprise a soluble or partly soluble polymer blend of (a) about 1 to 99 parts by weight polyglutarimide and (b) about 99 to 1 part by weight of (1) a styrene-acrylonitrile copolymer, (2) a multiple stage polymer having a styrene-acrylonitrile copolymer stage, or (3) a mixture of (1) and (2). When the blend is soluble, it has a single Tg as measured by DSC between the individual Tg's of the glassy phase of the styrene-acrylonitrile copolymer and the polyglutarimide polymer, and it is generally optically clear over a wide range of temperatures, generally −40° C. to 100° C.

The compositions can also include the usual additives, for example impact modifier, rubber, additional polymer, filler, reinforcement, stabilizer, colorant, pigment and lubricant. When these additives are included, the composition is not necessarily transparent due to the presence of the additive or additives. The polyglutarimide is present in the blend in amounts of about 1 to 99 parts per hundred parts of polymer components in the blend, and can be any of the polyglutarimides described in the prior art. One preferred class of polyglutarimides is disclosed in Kopchick U.S. Pat. No. 4,246,374, which is hereby incorporated by reference. Modified polyglutarimides as described in Mueller U.S. Pat. No. 4,254,232 and Weese et al. U.S. Pat. No. 4,217,424 are also preferred. An especially preferred polyglutarimide is N-methyl glutarimide. Another preferred polyglutarimide is the product of urea or ammonia imidization of a methyl methacrylate-styrene copolymer which is reacted in an extruder.

The (b) component of the blend is about 99 to 1 part by weight of styrene-acrylonitrile copolymer, a multiple stage polymer having a styrene-acrylonitrile copolymer stage, or a mixture thereof.

The styrene-acrylonitrile (SAN) copolymers preferably contain styrene and acrylonitrile in ratio ranges of 10:1 to 1:1. Acrylonitrile-butadiene-styrene (ABS) resin, SAN-containing modifiers including ABS, MABS, all acrylic rubber systems such as SAN//BA, SAN-containing block copolymer and the like can be used. A styrene-acrylonitrile//butylacrylate (ASA) core-shell impact modifier is especially preferred. Substituted styrenes, especially lower alkyl and/or halo-substituted styrenes can be used in combination with styrene or in place thereof, and the word styrene herein is intended to include said substituted styrenes as well. Part or all of the acrylonitrile in the SAN polymer can be replaced by methacrylonitrile.

The polymer blends of this invention are produced by conventional melt or solvent blending techniques.

Because of unfavorable thermodynamics, i.e. entropy of mixing, polymer-polymer solutions are rare. A great deal of effort has gone into developing methods to predict polymer-polymer miscibility via complex cohesive energy density calculations involving the use of the Group Molar Attraction Tables, but the calculations are approximate at best. The Group Molar Attraction constants for the imide moiety have never been reported in the literature. Therefore, due to the unpredictability of theoretical calculations and the fact that such polymer solutions are rare, it is truly surprising that imide polymer/SAN polymer systems exhibit mutual solubility. This solubility phenomenon results in polymers with enhanced property balances such as heat distortion temperature, tensile strength, tensile modulus, optical quality, rhelogical behavior, and impact strengh.

By solubility is meant systems in which a single Tg as measured by DSC is observed in the region numerically between the bounds imposed by the Tg of the glassy phase of the SAN polymer and the Tg of the imide polymer. It should be noted that a typical ABS will retain its rubbery-phase Tg. Partial solubility exists when two glassy phase Tg are present and the initial glassy phase Tg of either or both of the components is moved significantly towards the other component's Tg. Low amounts of one ingredient or the other may confuse this definition since movement would be very slight with small amounts of material, and so optical appearance, i.e. clarity, as well as the performance of other more definitive blends, i.e. higher in the junior ingredient, will serve as alternate tests of solubility. The occurrence of a refractive index match at the temperature at which appearance is assessed may give a false "clear" rating of a blend. A check for clarity due to solubility is to assess clarity vs. temperature, and if the blend is clear over a wide range of temperatures, it is soluble. Insolubility is defined as a mixture with two separate Tg's undisturbed from their original premixture value, and are typically opaque depending on the concentration of ingredients.

Without intending to be bound, the following examples are presented to illustrate a few embodiments of the invention.

EXAMPLES

EXAMPLES 1 TO 21

A series of blends of an SAN copolymer (Tyril 867) and a variety of N-methyl glutarimide polymers prepared via the teachings of U.S. Pat. No. 4,246,374 were melt blended in a 1" Killion single screw extruder at 480°–510° F. barrel/die temperature and 73 rpm screw speed. Optical quality and DSC behavior of the blends are presented in Tables I and II.

By our definitions of solubility and partial solubility and insolubility (see page 6) 131° Vicat and 140° C. Vicat imides are soluble with Tyril 867; 150° C. Vicat imide is partially soluble and 159°, 170° and 178° Vicat imides are insoluble.

TABLE I

SAN (Tyril 867)/Poly (N—methyl glutarimide) Blends Displaying Single Tg Behavior

| Example No. | Imide Type | Blend Imide/SAN | Tg | Appearance |
|---|---|---|---|---|
| 1. | — | 0/100 | 110° C. | Clear |
| 2. | 131° Vicat | 5/95 | 112° C. | Clear |
| 3. | 131° Vicat | 50/50 | 122° C. | Clear |
| 4. | 131° Vicat | 95/5 | 126° C. | Clear |
| 5. | 131° Vicat | 100/0 | 130° C. | Clear |
| 1. | — | 0/100 | 110° C. | Clear |
| 6. | 140° Vicat | 5/95 | 110° C. | Clear |
| 7. | " | 50/50 | 120° C. | Clear |
| 8. | " | 95/5 | 132° C. | Clear |
| 9. | " | 100/0 | 140° C. | Clear |

TABLE II

SAN (Tyril 867)/Poly (N—methyl glutarimide) Blends Displaying Double Tg Behavior

| Example No. | Imide Type | Blend Imide/SAN | Tg | Appearance |
|---|---|---|---|---|
| 1. | — | 0/100 | 110° C. | Clear |
| 10. | 150° C. Vicat | 5/95 | 113° C. | Transparent |
| 11. | " | 50/50 | 121,142° C. | Opaque |
| 12. | " | 95/5 | 146° C. | Clear |
| 13. | " | 100/0 | 149° C. | Clear |
| 1. | — | 0/100 | 110° C. | Clear |
| 14. | 159° C. Vicat | 5/95 | 112° C. | Translucent |
| 15. | " | 50/50 | 112,156° C. | Opaque |
| 16. | " | 95/5 | 112,157° C. | Hazy-Clear |
| 17. | " | 100/0 | 157° C. | Clear |
| 1. | — | 0/100 | 110° C. | Clear |
| 18. | 171° C. Vicat | 50/50 | 112,169° C. | Opaque |
| 19. | " | 100/0 | 169° C. | Clear |
| 1. | — | 0/100 | 110° C. | Clear |
| 20. | 178° C. Vicat | 50/50 | 113,175° C. | Opaque |
| 21. | " | 100/0 | 175° C. | Clear |

EXAMPLES 22 TO 34

Blends of ABS (Abson 89140) and the series of imide polymers disclosed in Examples 1 to 21 were prepared by melt blending in a 1" Killion single screw extruder under the following conditions:

| | Blend Composition (ABS/Imide) | | |
|---|---|---|---|
| | 95/5 | 50/50 | 5/95 |
| Barrel Temperature | | | |
| Zone 1 | 440 | 480 | 500 (°F.) |
| Zone 2 | 440 | 480 | 500 (°F.) |
| Zone 3 | 440 | 480 | 500 (°F.) |
| Die Temperature | 440 | 480 | 500 (°F.) |
| Screw Speed | 69 rpm | | |

Samples are listed in Table III. Single Tg behavior in the glassy phase (the rubber Tg remains) is observed for all samples listed. Optical appearance is complicated by the presence of insoluble (distinct Tg) rubber.

TABLE III

ABS(Abson 89140)/Poly (N—methyl glutarimide)Blends

| Example No | Imide Type | Blend Imide/ABS | Thermal Behavior DTUFL (264psi) | Tg | Appearance |
|---|---|---|---|---|---|
| 22 | — | 0/100 | 85° C. | 110° C. | Opaque (refractive index mismatch with rubber) |
| 23 | 131° C. Vicat | 5/95 | 86° C. | 112° C. | Opaque |
| 24 | " | 50/50 | 95° C. | 121° C. | Opaque |
| 25 | " | 95/5 | 101° C. | 126° C. | Translucent |
| 26 | " | 100/0 | 105° C. | 130° C. | Clear |
| 22 | — | 0/100 | 85° C. | 110° C. | Opaque |
| 27 | 140° C. Vicat | 5/95 | 87° C. | 111° C. | Opaque |
| 28 | " | 50/50 | 105° C. | 124° C. | Translucent |
| 29 | " | 95/5 | 118° C. | 138° C. | Transparent |
| 30 | " | 100/0 | 116° C. | 139° C. | Clear |
| 22 | — | 0/100 | 85° C. | 110° C. | Opaque |
| 31 | 150° C. Vicat | 5/95 | 85° C. | 112° C. | Opaque |
| 32 | " | 50/50 | 105° C. | 130° C. | Translucent |
| 33 | " | 95/5 | 127° C. | 148° C. | Hazy-Clear |
| 34 | " | 100/0 | 129° C. | 149° C. | Clear |

Examples 22 and 26 are controls.

EXAMPLE 35

Electric mill roll blends (10 phr and 30 phr) of Tyril 867 and a proton substituted-polyglutarimide derived from urea (or ammonia) imidization of 55 MAA/45 styrene feedstock gave transparent, single Tg products. The samples remained clear when heated to 150° F. in a vacuum oven.

EXAMPLES 36–50

Melt blends of rubber containing SAN polymer systems and poly (N-methyl glutarimide) resins were prepared and examined for impact resistance. Results of these studies are presented in Table IV. For comparison, non-soluble pMMA outer shell impact modifiers are included in the table.

TABLE IV

Impact Resistance of Blends of Poly(N—methyl glutarimide) Resins and Rubber-Containing SAN Compositions

| Example No. | SAN-Based Mat'l. | Imide/SAN Imide Type | Blend Ratio (ft-lbs/BasedMat'l. | Notched Izod Value in.notch |
|---|---|---|---|---|
| ABS-Type Composition ||||| 
| 36(control) | ABS(Abson 89140) | — | 0/100 | 4.5 |
| 37 | " | 131° C. Vicat | 5/95 | 3.9 |
| 38 | " | 140° C. Vicat | 5/95 | 4.1 |
| 39 | " | 150° C. Vicat | 5/95 | 3.9 |
| 40(control) | ABS(Abson 89120) | — | 0/100 | 3.5 |
| 41 | " | 150° C. Vicat | 50/50 | 3.0 |
| All Acrylic Modifier Compositions ||||| 
| 42(comparative) | No SAN: 35 MMA//65 BA | 150° C. Vicat | 40 modifier/60 imide | 2.8 |
| 43 | 35(3:1 SAN)//65 BA | 150° C. Vicat | 40/60 | 4.4 |
| 44 | 35(1:1 SAN)//65 BA | " | 40/60 | 2.6 |
| 45(comparative) | No SAN: 35 MMA/65 BA | 170 Vicat (high MW) | 40/60 | 1.8 |
| 46 | 35(3:1 SAN)//65 BA | 170 Vicat (high MW) | 40/60 | 2.9 |
| 47 | 35(1:1 SAN)//65 BA | 170 Vicat (high MW) | 40/60 | 1.4 |
| 48(comparative) | No SAN 35 MMA//65 BA | 170 Vicat (low MW) | 40/60 | 1.6 |
| 49 | 35 (3:1 SAN)//65 BA | 170 Vicat (low MW) | 40/60 | 4.2 |
| 50 | 35 (1:1 SAN)//65 BA 65 BA | 170 Vicat (low MW) | 40/60 | 1.7 |

Note: Samples 45–47 and 48–50 show the effects of MW on modifier-to-matrix adhesion. It is known in the art that the lower the MW of the blended polymers, the wider the allowable composition range to achieve solubility. While high MW imide is not compatible with 3:1 SAN (see Example 18), a lower MW imide is quite effectively impact-modified by the 3:1 SAN outershell modifier. We interpret this as evidence of increased solubility (or partial solubility) as a function of MW.

EXAMPLES 51–59

A series of 60/40 blends of selected poly (N-methyl glutarimide) resins and all acrylic modifiers were extrusion blended and evaluated for physical property performance. Results are tabulated in Table V.

I claim:

1. Composition comprising a soluble or partly soluble blend of (A) about 1 to 99 parts by weight polyglutarimide and (B) about 99 to 1 part by weight of (1) a single stage polymer consisting essentially of a styrene-acrylonitrile copolymer, or (2) a mixture of (1) with a multiple stage polymer having a final stage consisting essentially of a styrene-acrylonitrile copolymer.

2. Composition of claim 1 comprising a soluble blend of polyglutarimide and a styrene-acrylonitrile copolymer.

3. Composition of claim 1 wherein the blend has a single Tg as measured by DSC between the individual Tg's of the glassy phase of the styrene-acrylonitrile copolymer and the polyglutarimide polymer.

Performance Properties of MMA and SAN Outershell Modifiers in Selected Methyl Glutarimide Polymers

| Example No. | 51 | 52 | 53 | 54 | 55 | 56 | 57 | 58 | 59 |
|---|---|---|---|---|---|---|---|---|---|
| Imide Type | 150° Vicat | 150° Vicat | 150° Vicat | 170° Vicat-(High MW) | | | 170° Vicat (Low MW) | | |
| Modifier Outerstage | 1/1 SAN | 3/1 SAN | pMMA | 1/1 SAN | 3/1 SAN | pMMA | 1/1 SAN | 3/1 SAN | pMMA |
| Notched Izod, ft-lbs/in. | 2.6 | 4.4 | 2.8 | 1.4 | 2.9 | 1.8 | 1.7 | 4.2 | 1.6 |
| Unnotched Izod, ft-lbs/in. | 14.2 | 28.6 | 22.6 | 9.4 | 23.0 | 18.2 | 15.6 | 39.6 | 23.4 |
| GVHIT @ 100 mills, in-lbs | 15 | 81 | 48 | 10 | 16 | 13 | 9 | 84 | 39 |
| Tensile Impact, ft-lbs/in$^2$ | 63 | 159 | 41 | 22 | 55 | 31 | 71 | 114 | 84 |
| Tensile Strength | | | | | | | | | |
| @ yield, psi | 6800 | 6500 | 7030 | 6800 | 5700 | 6800 | 6700 | 6200 | 7000 |
| @ break, psi | 6200 | 6100 | 5800 | 6600 | 3000 | 6600 | 6100 | 5200 | 5000 |
| Elongation @ yield | 7.7 | 5.4 | 5.9 | 6.9 | 5.1 | 6.0 | 7.2 | 7.4 | 6.7 |
| @ break | 15.3 | 21.5 | 29.7 | 7.4 | 10.2 | 6.3 | 13.8 | 19.4 | 14.0 |
| Tensile Modulus ($\times 10^3$ psi) | 288 | 335 | 349 | 336 | 312 | 354 | 328 | 320 | 347 |
| DTUFL, 264 psi (°C.) | 106 | 109 | 115 | 115 | 121 | 123 | 108 | 107 | |

4. Composition of claim 1 wherein the blend is optically clear over a range of temperatures.

5. Composition of claim 1 wherein said polyglutarimide is an N-methyl glutarimide.

6. Composition of claim 1 wherein said polyglutarimide is the product of urea or ammonia imidization of a methyl methacrylate-styrene copolymer in an extruder.

7. Composition of claim 1 wherein said multistage polymer is a styrene/acrylonitrile//butyl acrylate (ASA) core-shell impact modifier.

8. Composition of claim 1 wherein said blend is partly soluble and has two individual glassy phase glass transition temperatures, Tg, as measured by DSC which are displaced from the values displayed by the unblended components and which lie between them.

9. Composition of claim 1 wherein said styrene is selected from the group consisting of styrene, lower alkyl and/or halo-substituted styrenes.

10. Composition of claim 1 wherein said acrylonitrile component is replaced by methacrylonitrile.

11. Composition of claim 1 wherein said blend is transparent.

12. Composition consisting essentially of a soluble or partly soluble blend of (A) about 1 to 99 parts by weight polyglutarmide and (B) about 99 to 1 part by weight of a single stage polymer consisting essentially of a styrene-acrylonitrile copolymer.

* * * * *

UNITED STATES PATENT AND TRADEMARK OFFICE
CERTIFICATE OF CORRECTION

PATENT NO. : 4,436,871

DATED : March 13, 1984

INVENTOR(S) : William H. Staas

It is certified that error appears in the above-identified patent and that said Letters Patent is hereby corrected as shown below:

Col. 5, lines 5-9, Table IV, last 3 column headings:

| "Imide/SAN Imide Type | Blend Ratio (ft-lbs/ Based Mat'l. | Notched Izod Value in.notch)" |
|---|---|---| should be

| --Imide Type | Blend Ratio Imide/SAN Based Mat'l. | Notched Izod Value (ft-lbs/ in.notch)-- |
|---|---|---|

Signed and Sealed this

Twenty-first Day of August 1984

[SEAL]

Attest:

*Attesting Officer*

GERALD J. MOSSINGHOFF

*Commissioner of Patents and Trademarks*